Sept. 15, 1942.  G. L. GUSTAFSON  2,295,651
APPARATUS FOR COOKING FOOD PRODUCTS
Filed June 8, 1938  5 Sheets-Sheet 1

INVENTOR
GEORGE L. GUSTAFSON
BY
William T. Kiesner
ATTORNEY

Sept. 15, 1942.                G. L. GUSTAFSON                2,295,651
                       APPARATUS FOR COOKING FOOD PRODUCTS
                       Filed June 8, 1938            5 Sheets-Sheet 5
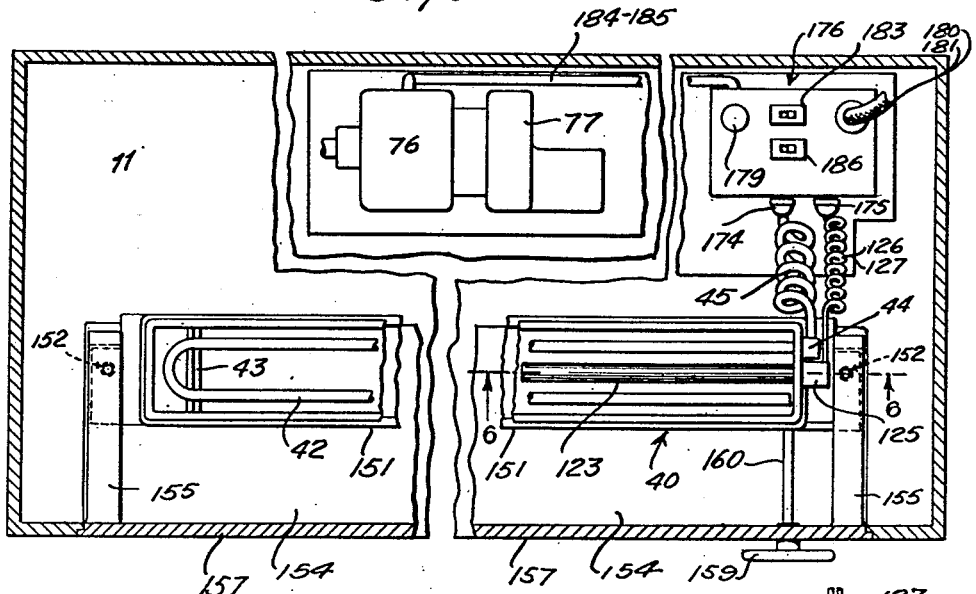
Fig. 5.
Fig. 6.
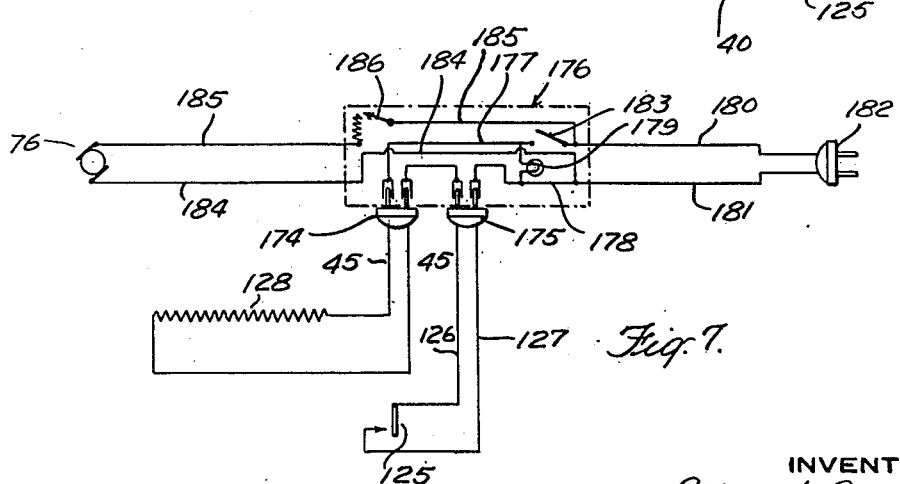
Fig. 7.
INVENTOR
GEORGE L. GUSTAFSON
BY William T. Kniesner
ATTORNEY Patented Sept. 15, 1942

2,295,651

UNITED STATES PATENT OFFICE 2,295,651

APPARATUS FOR COOKING FOOD PRODUCTS

George L. Gustafson, Danbury, Conn.

Application June 8, 1938, Serial No. 212,614

15 Claims. (Cl. 53—7)

This invention relates to an apparatus for cooking particularly food products such as nuts, and the like.

One of the objects of this invention is to provide a practical, reliable and efficient machine for cooking products like, for example, nuts, and to provide a compact, sanitary machine of this character capable of open use in, for example, a retail establishment, without contaminating the atmosphere with cooking or other odors, or the like, and that will be capable, furthermore, of functioning as a mechanism attractive in appearance and effective to attract attention, lending itself, therefore, admirably for window display operation; another object is to carry out the just stated objects in such a manner that the machine is capable of long-continued operation without manual attention and, furthermore, is capable of such rapid and quick servicing as, for example, for the purpose of replenishing supplies of materials, as will not detract from achieving or carrying on the display feature of operation of the machine. Another object is to provide a machine of the above-mentioned character capable of embodiment in such diminutive form without unduly restricting its output, that if displayed in a show window, for example, adequate room is left for other displays.

Another object is to provide a machine of the above-mentioned character that will be dependable and safe in operation, strong and durable in construction, and in general sufficiently foolproof to permit of simple and hence unskilled handling, servicing, or the like. Another object is to provide a food-treating machine for both production and display purposes that will be capable of easy control or determination of rate of output so that continuity of display operation may be achieved while at the same time the production of the machine varied to meet the actual needs of the particular establishment. Another object is to provide a machine of the above-mentioned character that will be easy to maintain in clean and sanitary condition and which in general will be well adapted to meet the widely varying conditions of practical use.

Another object is to provide a machine of the above-mentioned type that will be inexpensive to manufacture and inexpensive to maintain. Another object is to provide a machine of the above-mentioned character capable of efficient operation and capable of effecting only low consumption or utilization of cooking liquid. Another object is to provide a machine of the above-mentioned character that will be of small volume and that makes efficient use of smallness of space that can be allotted to it. Another object is to improve in general apparatus for cooking food products in measurable increments or successive quantities. Other objects will be in part obvious or in part pointed out hereinafter.

The invention accordingly consists in the features of construction, combinations of elements, and arrangements of parts as will be exemplified in the structure to be hereinafter described and the scope of the application of which will be indicated in the following claims.

In the accompanying drawings in which is shown a preferred one of the various possible embodiments of my invention, Figure 1 is a front elevation of the complete apparatus;

Figure 5 is a horizontal sectional view or plan, as seen along the line 5—5 of Figure 1, certain parts being broken away;

Figure 6 is a vertical sectional view on an enlarged scale, as seen along the line 6—6 of Figure 5, showing a thermostatic control element;

Figure 7 is a diagrammatic representation of a possible circuit arrangement.

Similar reference characters refer to similar parts throughout the several views of the drawings.

Referring first to Figures 1-4, the apparatus which, as later pointed out, can be made in comparatively diminutive form, is preferably constructed to be enclosed in a casing generally indicated at 10, the casing being preferably constructed so that preferably sheet glass may be employed and being preferably also so constructed as to take part in certain structural and functional features of the mechanism.

Figure 2:
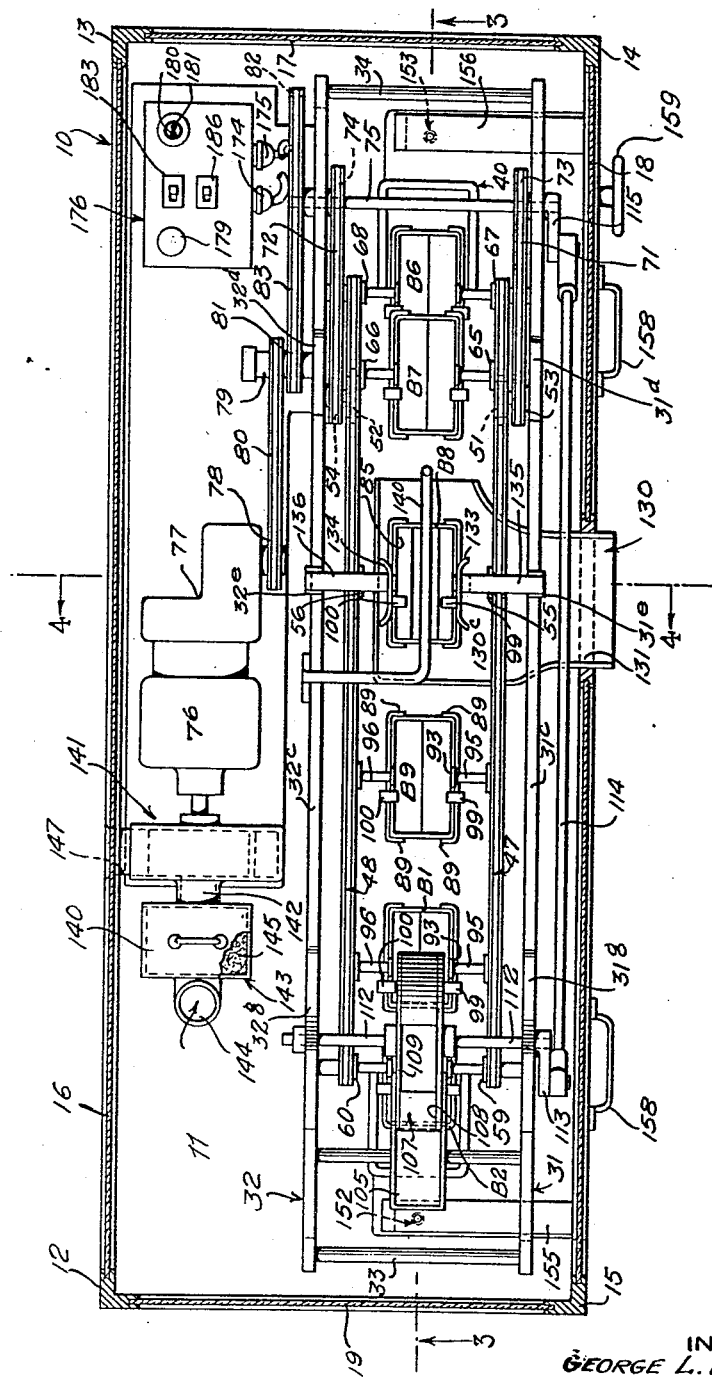
Figure 2 is a plan view or elevation, as seen along the line 2—2 of Figure 1.
Figure 3:
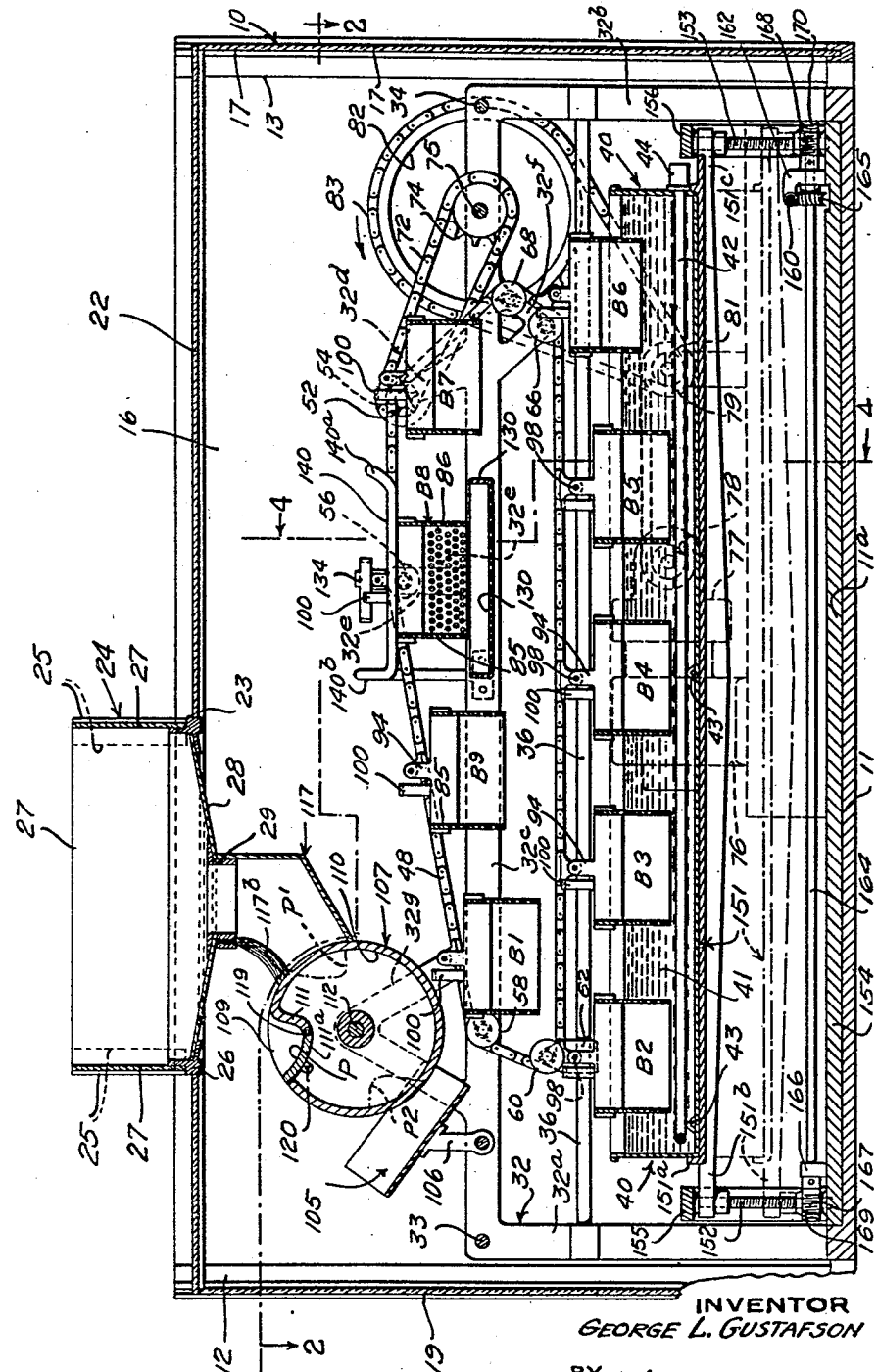
Figure 3 is a longitudinal vertical sectional view, as seen along the line 3—3 of Figure 2.
Figure 4:
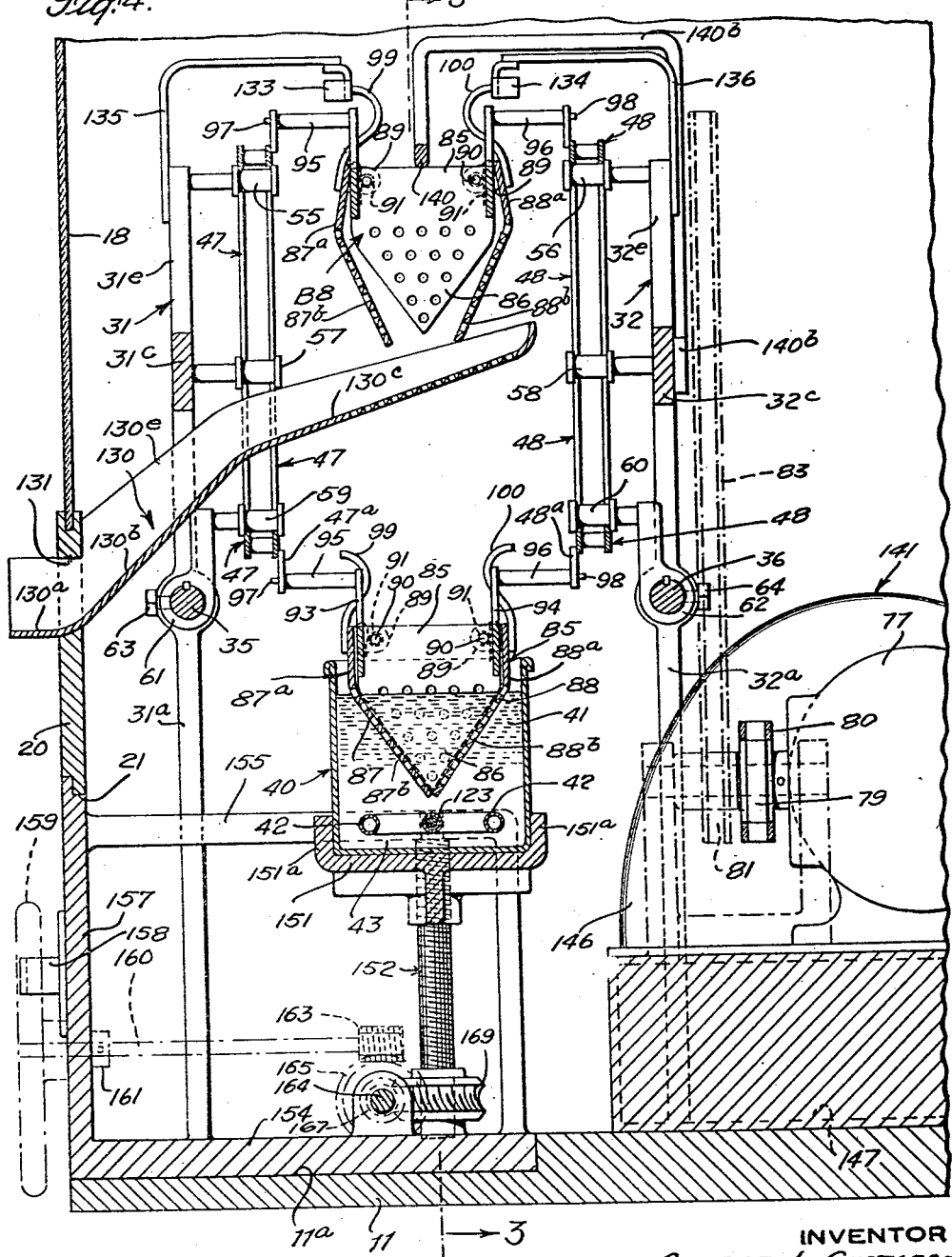
Figure 4 is a transverse vertical sectional view, on an enlarged scale, as seen along the line 4—4 of Figures 1 and 2.

The casing 10 may be built up in any suitable way, and preferably comprises a base or base plate 11 (Figures 3 and 4) with uprights 12, 13, 14 and 15 (Figure 2) at the corners thereof and preferably grooved or constructed, as is better shown in Figure 2, to receive plate-like members 16, 17, 18 and 19 to form the vertical walls of the casing; plate members 16, 17 and 19 are preferably wholly of glass while plate member 18 at the front of the casing (see Figure 4) is of glass only throughout the upper extent of the front wall, the lower extent thereof being preferably made up of some other material, like metal, as indicated at 20 in Figure 4, that portion having a longitudinally extending aperture 21 therein for a purpose later described.

The upper or top end of the casing 10 is closed by a plate member 22 (Figure 2), also preferably of glass, and near the left-hand end thereof it is provided with an aperture 23; this aperture 23 may, for convenience, be square or rectangular and has related to it a bin or hopper 24. The latter may be constructed of upright corner frame members 25 of metal carried by a frame 26 appropriately related to the aperture 23, the uprights 25 holding in position four plate members 27, preferably of glass, while the frame member 26 has connected to it a funnel-like bottom member 28 which may be of sheet metal and which is apertured preferably centrally, as at 29, the conformation of the bottom member 28 being such as to slope downwardly toward the aperture 29. It is into the hopper 24 that the products to be treated or cooked are poured or dumped, illustratively shelled nuts or nut kernels, in a suitable initial mass or quantity, the construction insuring that the kernels gravitate to the opening 29 from which they are transferred to the apparatus, as is later described.

A preferred form of apparatus comprises a frame preferably made up of two spaced side frames generally indicated at 31 and 32 which preferably are in general of inverted U-shape. Thus, frame 31 has uprights 31ª, 31ᵇ (Figure 1) at its opposed ends joined by the horizontal part 31ᶜ, the uprights resting upon and being secured in any suitable way to the base plate 11 and similarly the frame member 32 (Figure 3) has corresponding uprights 32ª, 32ᵇ, joined by the horizontal part 32ᶜ.

The frame parts 31—32 may be held in spaced relation, not only by the base plate 11 but also by crossbars 33 and 34 preferably at the respective ends of the frame members so as to leave the space between the horizontal parts 31ᶜ and 32ᶜ substantially unobstructed. As better appears from Figure 2, the base plate 11 is of a width to extend rearwardly of the longitudinally extending frame 31—32 to leave a space for purposes later described.

Extending underneath and parallel to the longitudinal frame parts 31ᶜ and 32ᶜ are two frame members 35 and 36 (Figures 1, 3 and 4) and they are preferably in the form of round rods bridged across the frame uprights 31ª—31ᵇ and 32ª—32ᵇ, the latter being appropriately apertured to receive the ends of these rods which are anchored or secured thereto in any suitable way, thus adding to the rigidity of the frame and also preferably serving purposes about to be described.

Extending lengthwise of the frame 31—32 and between the two frame members thereof is a cooking tank generally indicated at 40 (Figures 3 and 4), supported in a preferred manner later described. The tank 40 is of a width (Figure 4) to be easily accommodated between the frame parts 31—32 and is of a length (Figure 3) approximating that of the frame parts. It is preferably made of sheet metal or other suitable sanitary material and is adapted to receive a suitable cooking liquid, indicated at 41, such as an appropriate oil where certain kinds of nuts are to be cooked. The cooking liquid is raised to a suitable temperature, preferably by means of an electrical heating unit of any suitable electrical construction but preferably embodied mechanically in metallic tubular form, the heating element or elements being accommodated within the tube; the heater device is indicated in Figures 3 and 4 at 42 and, as is better shown in Figure 5, it is preferably U-shaped to fall within the projected area of the bottom of the tank or receptacle 40, being suitably supported at its one end, as by an appropriate abutment 43 (Figures 3 and 5), and at its other end being preferably supported by the end wall of the tank 40 through which it is passed in any suitable liquid-tight way to terminate in a terminal or connector device 44 to which is connected a two-conductor flexible cord or insulated conductor 45 to facilitate connection to a suitable source of electrical energy. The heater element is preferably constructed to operate from the usual 110-volt lighting circuits. With this tank and heater certain other mechanisms and apparatus coact.

The frame 31—32 supports, for movement in a closed path, the plane of which is preferably vertical and preferably coincident with the vertical central plane of the tank 40, a suitable number, illustratively nine, containers or buckets, which I will hereafter term "baskets," and in Figure 3 the baskets are shown at B¹, B², B³, B⁴, B⁵, B⁶, B⁷, B⁸ and B⁹, and hence for movement in the vertical space between the laterally spaced frame members 31 and 32.

Preferably these baskets B¹, B², etc., are carried by two spaced flexible wire elements, preferably taking the form of sprocket chain, and in Figures 2 and 4 the two spaced chains are indicated at 47 and 48. The configuration of the closed path of movement of the pair of chains and hence of the baskets is preferably determined by rotary chain supports which preferably comprise flanged rollers or pulleys and at least one driven sprocket for each chain. Thus, referring to Figure 1, the horizontal frame part 31ᶜ has an upstanding arm 31ᵈ in the upper end of which is mounted a short shaft having secured thereto two sprockets 51 and 53, arm 31ᵈ being offset toward the center plane of the frame to bring both sprockets to the inside of the vertical plane of the side frame part 31. Chain 47 meshes with and passes over the sprocket 51 which may be driven by driving the sprocket 53 as hereinafter described.

Figure 1:
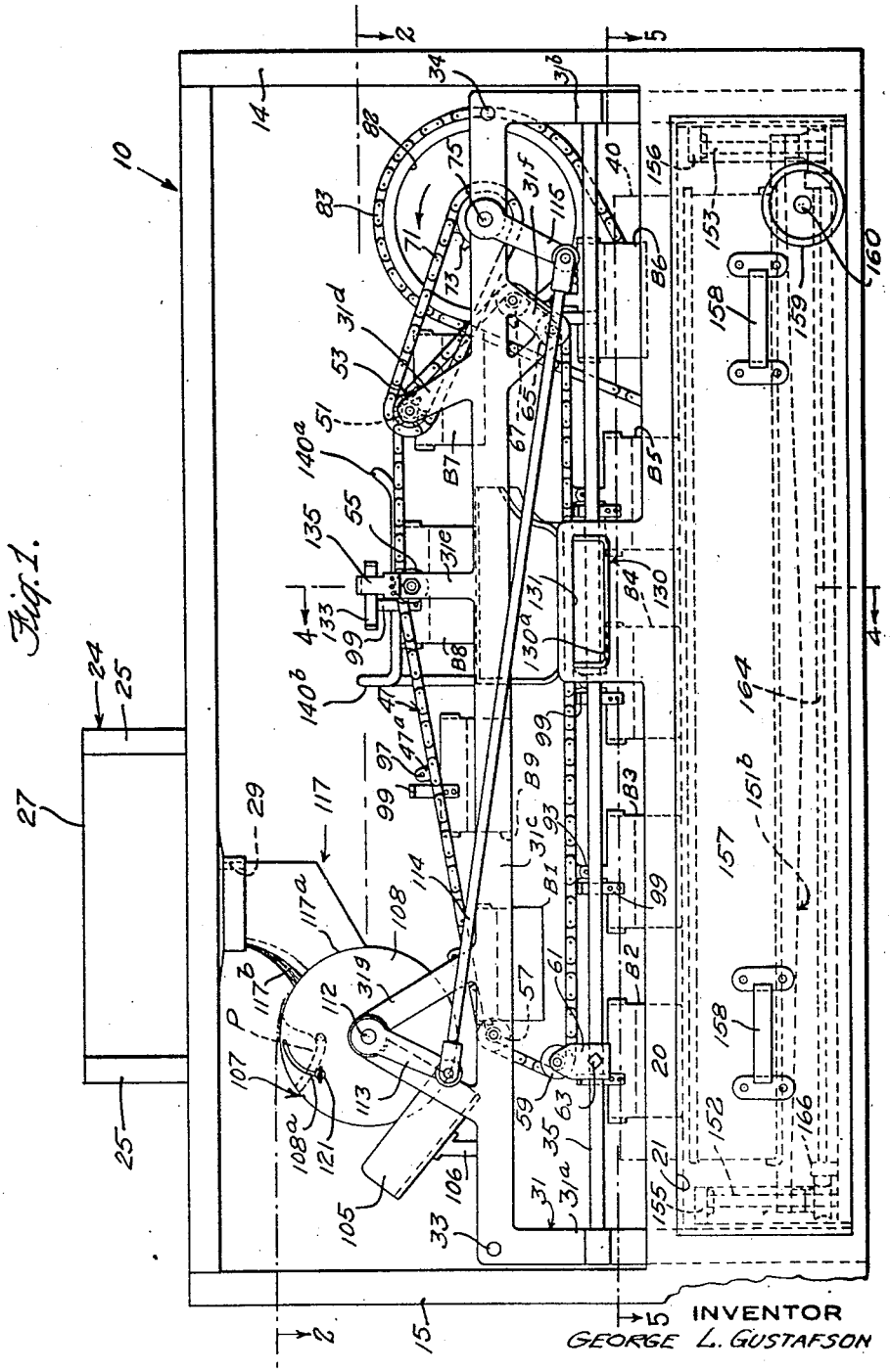

Viewing the above-mentioned closed path of movement in a counter-clockwise direction, as seen in Figure 1, the chain 47, from the sprocket 51 passes horizontally throughout a short section of this path over a guide and supporting pulley 55, the latter being mounted rotatably on a suitable inwardly projecting stud carried by an upstanding arm 31ᵉ of the frame (Figures 1 and 3).

From the roller support 55 the chain 47 passes through another portion of the path which happens to be downwardly inclined toward the left (Figure 1) whence it passes over a pulley or roller support 57 supported by a suitable stud projecting inwardly from the frame part 31ᶜ (Figures 1 and 4).

Passing over the pulley 57, the chain partakes of a somewhat abrupt downward slope (Figure 1) to pass over a guide pulley 59 which is carried by a suitable stud mounted in a support 61 that is slidably mounted upon or splined to the frame rod 35 and provided with suitable means, such as a lock screw 63, for locking it and hence the pulley 59 in selected position; by this means, as will later appear, the chain 47 may be given appropriate tautness.

Passing around pulley 59 the chain 47 then passes horizontally to substantially the other end of the frame structure where it passes successively over the guide rollers or pulleys 65 and 67 suitably supported as by studs projecting inwardly from a suitable downwardly extending portion 31$^f$ of the frame member 31, and from pulley 67 it passes on to the driven sprocket 51.

In like manner chain 48 (Figure 3) passes over a driven sprocket 52 which is mounted on the same shaft with a driving sprocket 54, the shaft being rotatably supported by the frame extension 32$^d$ offset inwardly toward the central vertical plane of the frame 31—32, thence passing horizontally over a guide and supporting pulley 56 carried by the upstanding frame extension 32$^e$, thence extending with a somewhat downward inclination to pass over the pulley 58 from which it extends at a more substantial angle downwardly to pass over the pulley 60 which, like the pulley 59 of Figure 1, is carried by a support 62 likewise slidably related or splined to the frame rod 36 to which it may be locked in adjusted position by a set screw 64. From pulley 60 the chain 48 extends horizontally to pass around the guide pulleys 66 and 68 suitably supported by a frame extension 32$^f$, whence the chain passes upwardly to the driven sprocket 52.

The various sprockets and pulleys, respectively carried by the opposed or spaced frame parts 31, 32 are, it will be understood, coaxially alined to be paired, as better appears from Figures 2 and 4. Thus, the driving sprockets 51, 52 form a pair that are coaxial, roller or pulley supports 55 and 56 form another coaxial pair, pulleys 57, 58 form the next coaxial pair, and so on throughout the path of movement of the chains 47—48.

Synchronism of movement of the two parallel chains 47—48 is insured by driving the driving sprockets 53 and 54 (Figure 2) synchronously and an illustrative form of drive is indicated in Figures 1, 2 and 3 where chains 71 and 72 connect the sprockets 53 and 54, respectively, to sprockets 73 and 74 which are rigidly mounted on the driving shaft 75. Driving shaft 75 extends crosswise of the frame and is mounted in suitable bearings formed in the right-hand ends of the horizontal frame portions 31$^c$ and 32$^c$. The rearward end of shaft 75 is connected by suitable means to be driven by an electric motor 76 (Figures 2, 4 and 5) and the driving connection may comprise reduction gearing, appropriately housed, as at 77, sprockets 78—79 connected by the chain 80 (Figure 2), sprocket 81, driven by the shaft of sprocket 79, and sprocket 82 connected with sprocket 81 by chain 83. Sprocket 82 is mounted on the rearward end of shaft 75. As indicated in Figure 3, these various sprockets may also be proportioned, if desired, to achieve further speed reduction of drive of the shaft 75.

With the motor 76 in operation, the chains 47, 48 may thus be driven at a suitable rate of movement, which is preferably relatively low but which may be varied in any suitable manner, as by varying the speed of the motor 76, to suit the particular needs of the product being treated.

For example, and referring to Figure 3, it will be noted that the lower and horizontal portion of the closed path through which the chains and the baskets move, that is, from the pulleys 59—60 near the left-hand end of the frame to the pulleys 65—66 near the right-hand end of the frame, parallels the tank 40 and it is throughout that portion of the path of movement of the baskets that the baskets with the products contained therein are submerged appropriately in the liquid 41. In the illustrative embodiment the just stated portion of the complete path of movement of a basket is approximately one-half of the total. And if the required treatment or cooking then is say on the order of three minutes, the speed of drive of the chains 47—48 may be adjusted so that a basket makes the traverse or circuit of the closed path in about six minutes. But other portions of this closed path coact in other functions and operations later described, all of which will be clearer after an understanding of the preferred construction of the baskets.

The baskets $B^1$, $B^2$, $B^3$, etc., are preferably of identical construction and of mounting with respect to the chains; hence it will suffice to describe only one in detail, preferably basket $B^5$, which appears in large section in Figure 4 and in which figure the basket $B^8$ also is shown. The basket is preferably made up of a pervious sheet material, such as perforated sheet metal, and it comprises preferably an upper rectangular band-like body portion 85, two opposed ends of which are extended downwardly, as at 86, in what is in general a downwardly pointed triangular shape or outline, the basket being preferably given a transverse cross-section shaped like the end walls 85—86. The opposed side walls 87, 88 are preferably made up of sheet metal and they are bent to have upper vertical portions 87$^a$ and 88$^a$ to parallel the opposed side portions of the band-like part 85, and inwardly directed portions 87$^b$ and 88$^b$, the angle of bend being such that in normal or closing position the lower portions 87$^b$ and 88$^b$ rest against the inclined edges of the end wall portions 86, 86. Where made of sheet metal, the perforations are preferably as shown in Figure 4.

The basket parts 87 and 88 are pivoted to the main frame or band-like portion 85, by pairs of ears 89, 89 (see also Figure 2) which may be made integral with the parts 87 and 88, respectively, and by suitable pins 90. Suitable springs operate upon the members 87 and 88 to hold them in the position shown in the lower part of Figure 4 with respect to the basket $B^5$, while permitting these side wall parts 87 and 88 to be swung away from each other to discharge the contents of the basket, as shown in the upper part of Figure 4 with respect to the basket $B^8$. These springs 91 may take the form of coil springs that extend about the pins 90, respectively, the latter being purposely made of sufficient length, each spring having two arms one of which engages the band-like portion 85 and the other engages an ear 89. Also, the springs are of sufficient tension to resist movement of the parts 87 and 88 away from each other under the weight of the material deposited in the basket.

Opposed side parts of the band-like portion 85 have upwardly extending lugs 93, 94 (Figure 4) and the latter at their upper ends have rigidly secured thereto studs 95 and 96, respectively, the latter being turned down at their ends to form trunnions 97 and 98. These trunnions engage in plates 47$^a$ and 48$^a$, respectively, which are carried by the chains 47 and 48, being part of a link of each chain or each attached to a suitable link or link member. In this manner the basket is pivotally supported between and by the spaced chains 47 and 48, and has to traverse the closed circuit or path defined or determined by the path of movement of the chain links themselves; moreover, the axis of pivoting will be seen to be preferably well above the center of gravity of the basket with or without its load and thus the basket always tends by its own weight to remain in vertical or untilted position with its open end or mouth, determined by the frame or band portion 85 thereof, exposed upwardly.

The separable or movable side wall parts 87 and 88 are provided with upwardly extending arms 99 and 100 (Figure 4) preferably shaped as shown in the drawings to provide at their upper ends outwardly and oppositely directed contact portions for a purpose later described. The arms 99, 100 may be made of any suitable material and may be related to the parts 87, 88 in any suitable manner, as by riveting, and the like. If the upper ends of the arms 99 and 100 are pressed or moved toward each other against the action of the springs 91, 91 the side wall and bottom-forming parts 87, 88 swing outwardly away from each other, as shown in the upper part of Figure 4, thus to discharge the contents of the basket.

Considering other coacting features of construction and also the operation of the apparatus, when a basket arrives, moving in the above-mentioned closed circuit or path in counter-clockwise direction, as viewed in Figure 3, at a point somewhat to the left of the position of basket B¹, for example, when the trunnion-carrying links of the chains 47—48 are just about passing over the pulleys 59 and 60, the mouth of the basket to the left of the trunnions becomes properly related to a downwardly inclined chute 105 carried by the opposed frame parts 31ᶜ, 32ᶜ by way of a suitable bracket 106, and at just about that time a charge of nut kernels, or the like, is delivered to the chute 105 which guides them into the mouth of the basket just positioned, the basket thus becoming charged with the selected portion or quantity of kernels.

For effecting the transfer of a selectable quantity of the material from the hopper 24 (Figure 3) to the chute 105, I preferably employ a transfer drum 107 made, for example, of sheet metal, and, like the width of the chute 105, of a width preferably less than the width of the mouth of the baskets B¹, B², etc. The drum 107 may comprise two end disk members 108 and 109 (Figures 1 and 3) which support between them and have secured thereto a sheet metal member which is cylindrical, as at 110, throughout an appropriate portion of the periphery of the two disk members 108—109, but which at another and appropriate portion, as at 111, is re-entrant, extending toward the axis of the drum, thus to form a peripheral pocket P in the drum, as clearly appears in Figure 3.

The drum 107 is rotatably mounted by means of a shaft 112 in suitable bearings in upward extensions 31ᵍ and 32ᵍ (Figures 1 and 3) of the opposed frame parts 31 and 32, and the front end of the shaft 112 (Figures 1 and 2) has mounted on it a crank 113 whose end is connected pivotally to a connecting rod 114 which extends to the front of the front frame member 31 and to the right, as viewed in Figures 1 and 2, to be connected pivotally to a crank 115 that is secured to the forward end of the main drive shaft 75.

The shaft 75 is driven continuously in counter-clockwise direction, and hence the crank arm 115 partakes of a like continuous rotary movement but the two cranks 113 and 115 and the connecting rod 114 are preferably of such relative lengths that the crank 113 and hence the drum 107 partakes of an oscillating movement about the axis of the shaft 112 and undergoes one cycle of two strokes for each revolution of the shaft 75 and crank 115. Each stroke is of almost 180° and is sufficient to swing the pocket P repeatedly between two extreme positions indicated in dotted lines in Figure 3 at P¹ and P² and so relatively positioned that position P¹ of the pocket P is the pocket-charging position and P² is the position where the discharge of the contents of the pocket P into the chute 105 and hence into the basket is completed.

The ratio of the driving connections between the shaft 75 and the chains 47—48 is such that, if there are nine baskets equidistantly spaced along the endless chains, as in the illustrative embodiment, the shaft 75 and hence crank 115 makes nine complete revolutions during the period that it takes one basket to traverse the complete circuit or path defined by the chains and accordingly the charging and measuring drum 107 partakes of nine cycles of oscillation during the same time interval, and hence one cycle for each basket. The timing or synchronism, moreover, is such that, upon the completion of charge of one basket, the pocket being in the position P² of Figure 3 and the charged basket being on its downward movement as determined by the pulleys 58 and 60, the drum 107 partakes of a stroke in clockwise direction to put pocket P at position P¹ to receive a charge and then partakes of its next stroke, now in counter-clockwise direction, to transfer the position of pocket P from position P¹ to the pocket discharging position P², all within the space of time that it requires the next succeeding basket to reach the charging or filling position with respect to the discharge end of the chute 105. Thus, the baskets may be charged as they are successively brought to the charging position or station.

Connected to the discharge aperture 29 (Figures 3 and 1) of the hopper 24 is a conduit 117 appropriately shaped as indicated to extend downwardly and thence to the left toward the peripheral face of the drum 107, the conduit 117 being of a width just about equal to the axial dimension of the drum 107 and its terminus or discharge mouth being curved, as at 117ᵃ, to substantially match the curvature of the drum periphery. Accordingly, when the oscillating drum 107 presents the cylindrical portion 110 to the mouth of the conduit 117, the conduit being filled with the product to be treated, the conduit 117 remains closed off even though the cylindrical drum part 110 moves across its mouth. But when the pocket-forming portion 111 (Figure 3) reaches the position P¹, it is presented to the mouth of the conduit 117 and thus the pocket P becomes charged. Upon the subsequent counter-clockwise stroke the upper or left-hand wall 117ᵇ of the conduit 117 prevents the pocket P from carrying with it any material, such as kernels, in excess of the level corresponding substantially to the geometric continuation (see Figure 3) of the cylindrical drum portion 110. For this purpose the wall portion 117ᵇ of the conduit 117 is preferably yieldable or resilient being made of any material suitable for that purpose and preferably being in the form of a comb-like brush of bristles, as indicated in Figures 1 and 3. Thereby, jamming or crushing or kernels, or the like, is prevented and yet positiveness and nicety of action achieved.

As earlier above pointed out, the apparatus lends itself for display purposes and the glass plate parts earlier above described permit the moving parts of the apparatus to be seen and viewed. For window display purposes, circumstances may arise where the normal rate of treatment or cooking may be greater than the demand and yet it would be undesirable to shut down the apparatus, for to do so would be to detract from the display features or purposes thereof. Accordingly, I provide for continuing the operation of the apparatus while cutting down on its rate of production, and this I preferably achieve by making the volume of the pocket P of the drum 107 (Figures 1 and 3) manually variable or adjustable, whereby, as occasion requires, the rate of output of the apparatus may be adjusted to the rate of demand without having to shut down the apparatus.

Thus, where the re-entrant part 111 that forms the pocket P is generally V-shaped with its apex directed toward the axis of the drum, I may subdivide the part 111 to provide a part 111a hinged as at 119, preferably keeping the axis of the hinge as near the axis of the drum 107 as possible, and provide the part 111a with an arcuate extension 120 which normally extends into the interior of the drum and underneath a part of the cylindrical wall portion 110.

With the part 111a—120 in the position shown in Figure 3, the pocket P is of maximum capacity but by shifting the position of the part in clockwise direction, the volume or capacity of the pocket P may be diminished according to the extent of such displacement, and any suitable means may be employed to manually lock the part in its set position. Thus, the disk member 108 (Figure 1) may be provided with a slot 108a that is arcuate, matching the arc of movement along which the part 120 is displaced; the latter may carry a threaded stud that projects through the slot 108a to receive a wing nut 121 by which the position of the part 111a—120 may be fixed.

A basket having been charged as above described, the trunnion-carrying links of the chains 47—48 now move in the rather steeply downwardly inclind path from the pulleys 57—58 to the pulleys 59—60, giving the now charged basket a descent sufficient to submerge its contents in the treating or cooking liquid 41 in the tank 40, arriving virtually at the position of basket B² of Figure 3. The just described movement of descent will be seen to be throughout a relatively short portion of the path or circuit but from the pulleys 59—60 to the pulleys 65—66 at the extreme right-hand end of the frame, the portion of the path traversed by the now charged basket is of substantial length and, as earlier above indicated, long enough to keep the basket contents under treatment to bring about the desired result; in cooking certain kinds of nuts, that period of time may be on the order of three minutes, by way of illustration.

During the traverse of the basket within and along the tank 40, the temperature of the bath is maintained appropriately and within appropriate limits by means preferably of a thermally responsive switch mechanism appropriately related to the tank 40 and to the electric heater element of the heater 42.

The switch part of the device, turning now to Figure 6, may be of any suitable construction and is indicated generally at 125, being provided with any suitable means for having connected thereto the two conductors 126 and 127, whereby the switch 125 may be connected in circuit with the heater element, which is shown in Figure 7 diagrammatically at 128 and which, as above described, is contained within the U-shaped tube housing portion of the heater 42. The thermally responsive element of the structure (Figure 6) preferably comprises a cylindrical or tube-like housing 129 containing a suitable volatile liquid, or the like, the vapor pressure of which varies in accordance with the temperature and closes or opens the switch 125 in accordance with changes in such vapor pressure. The right-hand end wall of the tank 40 has an aperture 40a in which is sealed in any suitable way, as by welding, a tube 123 closed at its left-hand end and projecting horizontally into the tank 40 and generally just above the bottom thereof and preferably (as shown in Figure 2) between the two arms of the U-shaped heater structure 42. The tube 123 thus forms a sealed chamber or pocket, accessible only from the exterior of the tank 40, and its internal diameter is so proportioned with respect to the outside diameter of the housing or tube part 129 of the thermal switch that it may snugly receive the housing 129. The conductors 126, 127 are preferably in the form of flexible cord conductor and thus the thermostatic switch structure may be easily assembled to the tank or removed therefrom, as may be necessary in cases of replacement or repair.

It is by such an illustrative and preferred arrangement that the temperature of the bath 41 is maintained within appropriate limits, and accordingly by the time the charged basket reaches the position of the basket B⁶ of Figure 3 and hence at the end of the above-mentioned horizontal portion of the path or circuit, and hence when the basket reaches the pulleys 65—66, the next portion of the path of movement is upwardly from pulleys 65—66, past pulleys 67—68 and up to sprockets 51—52, whence the next portion of the path is substantially horizontal up to the pulleys 55—56; during the first portion of the generally upward path, the basket, now containing the treated or cooked material, is lifted to the latter out of the bath in the tank 40, but it is to be noted that the parts are so constructed that thereafter, and through both of the just-mentioned portions of the path and hence up to the pulleys 55—56, the basket, though withdrawn from the bath, is held suspended over the tank 40 so that the latter catches any and all dripping of the liquid from the basket and its contents. Preferably, the duration of time during which this dripping is to take place is substantial, particularly where the liquid in the tank 40 has low viscosity, as may be the case where certain oils are used for cooking nut kernels, and thus I am enabled to insure that the product in the basket is satisfactorily dried off and also that there is no material loss of the liquid.

Arrived at just about the point corresponding to pulleys 55—56, and hence at the position of basket B⁸ in Figures 3 and 4, and with the contents of the basket well dripped off, discharge of the contents may now take place onto a discharge chute generally indicated at 130 and better shown in Figure 4. The discharge chute 130, which may be made of sheet metal, is shaped, as at 130a, to extend from an aperture 131 in the front plate 20, thence upwardly at a suitable incline, as at 130b, to extend in between the frame members 31c and 35, and incidentally also between the upper and lower reaches of the chain 47, and thence inwardly and preferably at a slighter upward inclination, as at 130c, to extend well underneath the basket when the latter reaches the position of basket B⁸ of Figure 3. The chute 130 may be made of sheet metal and is of a width (see Figure 3) that is preferably materially greater than the length of the basket and it is appropriately flanged, as at 130ᵉ, to guide the products discharged from the basket out through the wall aperture 131 and thus to the front of the machine or casing where they may be caught in a suitable receptacle. That portion 130ᶜ of the chute 130 which falls within the vertical planes of the longitudinal side walls of the tank 40 is preferably perforate, as indicated, so that any cooking liquid still associated with the kernels or the basket as these parts come to the discharge station, may be returned to the tank and prevented from running down the chute 130.

As the basket approaches the discharge position, the side and bottom wall members 87 and 88 (Figure 4) are moved away from each other, thus to empty the contents of the basket into the discharge chute. This opening movement of the movable walls I achieve preferably by causing the lever-like arms 99—100 to be operated upon and pressed toward each other and preferably I utilize the continued movement of the basket by the chains for effecting such actuation of the control members 99—100.

According to this preferred arrangement, I provide, in the region of the discharge station, two cam members 133—134 shaped as appears from Figures 2, 3 and 4 and positioned or mounted, as by the brackets 135 and 136, respectively, the latter being secured (Figures 1 and 2) to the upward extensions 31ᵉ and 32ᵉ, respectively, of the side frame members, just above the horizontal plane of the horizontal reaches of the chains 47 and 48 between the pulleys 51—52 and 55—56. These cam members are somewhat elongated (Figure 2) and are positioned in the path of horizontal movement of the ends of the basket levers 99—100. As is better shown in Figure 2, these cam members preferably have intermediate portions which can be parallel and end portions that curve away from each other sufficiently to form a throat opening large enough to permit the members 99—100 to enter when the latter are in the normal position, as shown in the lower part of Figure 4, and the intermediate portions form the narrowest part of the throat and sufficiently so to cause the basket parts 87—88 to be swung sufficiently enough in basket-opening direction to insure discharge of the products carried by the basket, as is indicated in Figure 4. The steady movement of the synchronized chains 47—48 simply pulls or forces the arms 99—100 into this progressively narrowing throat formed by the right-hand portions of the cam members 133 and 134 and as the basket continues to move to the left, as viewed in Figures 2 and 3, the left-hand portions of the cam members, curved as above described, permit the gradual return to normal position of the control levers 99—100 and hence of the basket wall parts 87 and 88, the springs 91, 91 acting to insure the return of these parts to basket-closing position. The above-mentioned width of the portion 130ᶜ of the discharge chute 130 (see Figures 2 and 3) is made sufficiently greater than the length of a basket to take in such range of movement of the basket at the discharge station as accompanies the opening and closing action above described, that range of movement being a function of the length of the cam members 133, 134.

Since with the above-described preferred arrangement of controlling the opening and closing movement of the basket parts the upper ends of the lever arms 99—100 (Figure 4) extend in a plane above the axis of the trunnions 97—98 so that when the cams and the lever arms coact there is a tendency to swing the basket about the axis of the trunnions, an action that might interfere with the proper coaction of these lever arms with their cams, I prefer to provide at the discharge station a suitable means to prevent such tilting from taking place. A preferred form of construction comprises a rod-like guide member 140 of a length greater than the length of a basket and positioned above the discharge chute portion 130ᶜ (see Figure 3) and at such a height that its lower edge falls in a horizontal plane of the top edges of the end walls 85, 85, member 140 being upwardly curved, as at 140ᵃ (Figure 3). As shown in Figures 2 and 4, the guide member 140 is positioned also midway between the vertical planes of the two chains and it may be constructed and positioned as just described by having its opposite end portion, as at 140ᵇ (Figures 3 and 4) appropriately bent, as shown, to extend rearwardly and thence downwardly where it is secured in any suitable manner to the side frame part 32ᶜ.

Accordingly, as the basket enters the discharge region and moves into and throughout it, the member 140, as better appears from Figure 3, may be engaged by the top edges of the end walls 85, 85 of the basket and the basket is thus prevented from tilting about the axis of its trunnions 97, 98. The member 140 is of a length sufficient to bridge the top edges of these two end walls throughout such range of movement of the basket as is necessary to begin and complete the coaction of the levers 99, 100 with the cams 133, 134, respectively.

With the discharge of the basket completed, the basket continues in its movement in a direction toward the left (Figures 1, 2 and 3) and progresses to the charging position or station, as earlier above described, whence the cycle with respect to that basket is repeated. Of course, the remaining baskets go through the same cycle.

As earlier above described, the apparatus is preferably encased and preferably the casing 10 comprises glass or like transparent material so that, particularly for display purposes, the movement and operation of the mechanism may be viewed. But I prefer to enclose the apparatus, preferably as above described, also to achieve certain other preferred advantages, results and co-actions. Thus, depending upon the product being cooked and the cooking liquid employed, illustratively nut kernels undergoing cooking in an appropriate oil, the processing gives rise to unpleasant odors which, particularly in retail shops, are undesirable. Accordingly, I prefer to associate with the motor 76 (see Figure 2) a blower or fan 141. It is preferably of the centrifugal blower type and hence has an axially positioned inlet 142 to which is connected a chamber 143 provided with a lid 140, chamber 143 in turn having an inlet 144 exposed to the interior of the casing 10. Within the chamber 143 and arranged in any suitable manner to be in the path of movement of air from the chamber inlet 144 to the blower inlet 142, is any suitable filtering medium indicated in Figure 2 at 145, such as charcoal, or the like, capable of deodorizing the atmosphere contaminated by the cooking vapors. The atmosphere, air or odorous cooking vapors within the casing 10 is thus drawn through the inlet 144, is filtered, and discharged by the blower 141 through its outlet 146 (see Figure 4) which discharges into an outlet passage or conduit 147 that is associated with the base plate 11 and which, as is better shown in Figure 2, discharges to the exterior of the casing 10 at the bottom of the rear face thereof. Furthermore, the blower maintains within the interior of the casing 10 a pressure somewhat below the atmospheric pressure externally of the enclosure 10 and thus effectively prevents odors, smells, gases, or the like, from escaping through the discharge opening 131 in the front wall (Figure 4) or from leaking out through the conduit 117 (Figure 3) and the hopper 24; moreover, through such openings as these, fresh air is drawn or flows into the casing 10 and particularly through the discharge opening 131 which, it will be noted, is positioned to the front of the cooking vat or tank 40 (see Figure 4 or Figure 2) while the inlet to the suction device is positioned to the rear and there is thus assured a steady and appropriate flow of air across the tank to carry with it any smells, vapors, gases, or odorous fumes.

The tank or vat 40 (see now Figures 3 and 4) is supported on a table 151 appropriately flanged, as at 151ª, to engage the side and end walls of the tank 40 and thus hold the latter against displacement while permitting the tank 40 to be lifted upwardly off of the table 151. Normally the table 151, as shown in the drawings and as is clear from the foregoing, is positioned at a height such that the baskets B¹, B², etc., are successively brought downwardly into the tank, moved along it and then raised out of it, but I make provision for lowering the tank and for permitting its removal from the casing 10 as may be necessary to clean it or to charge it with the appropriate liquid.

Accordingly and preferably, table 151 has end extensions 151ᵇ and 151ᶜ (Figure 3) which have in them threaded holes to receive the elevating screws 152 and 153, respectively. The screws are trunnioned as at respective ends and are journaled at their lower ends in suitable bearings provided in a plate member 154 and are journaled at their upper ends in end brackets 155 and 156, respectively, secured in any suitable manner to hold the screws 152, 153 with their axes vertical and parallel and against upward movement.

The plate member 154 is preferably seated in a suitable recess 11ª in the base plate 11 (Figures 3 and 4) the recess being open at its front end so that the plate member with the parts carried by it may be slid forwardly (to the left in Figure 4). Plate member 154 extends lengthwise of the front of the casing base plate 11 throughout an appropriate extent which, as in Figure 3, is slightly greater than the length of the tank 40, and in the front plate 20 (Figure 4) the opening 21, already above mentioned, is of corresponding length and of a height greater than the height of the screws and their upper supporting brackets 155; this opening 21 is normally closed by a vertical plate 157 which is secured to or formed integrally with the sliding plate 154, and conveniently the brackets 155—156 are shaped as shown in Figure 4, having a horizontal portion secured to the front plate 157 and a vertical portion secured to the slidable plate 154. The front plate 157 which closes the aperture 21 may be provided with handles 158 (Figures 1 and 2) for sliding the casing part 154—157 into and out of the casing 10.

Preferably I provide a suitable means, such as a hand wheel 159 (Figures 1 and 4) suitably mounted at the front face of the vertical closure plate 157 so that it may be easily accessible for manual manipulation, and hand wheel 159 I connect by any suitable means to actuate the screws 152, 153.

Illustratively, such means may comprise a horizontal shaft 160 suitably journaled as at 161 and 162 and extending through the plate 157 where it has connected to it the hand wheel 159; at its rear end the shaft 160 may be provided with a gear or worm 163 for driving a shaft 164 through a mating gear or worm wheel 165. Shaft 164 is suitably journaled in upstanding brackets 162 and 166 (Figure 3) and extends longitudinally of the plate member 154 and at its ends is provided with suitable gearing, such as worms 167 and 168, meshing respectively with companion gearing, such as the worm wheels 169 and 170 which are carried by the screws 152 and 153, respectively.

Accordingly, to remove the tank 40 out of operative relationship to the baskets and related mechanisms and without having to remove the baskets, hand wheel 159 is operated in an appropriate direction to rotate the screws 152 and 153 to cause the table 151 and hence the tank 40 to descend to a sufficient extent, whence, by means of the handles 158, 158 the casing part 154—157 may be slid horizontally and forwardly out of the casing 10 and the tank 40 removed or the cooking fluid replenished, or the like. Operating these mechanisms in reverse sequence restores the tank 40 to bring the cooking liquid into the path of the baskets.

The above described movements of the tank 40 are, in the preferred construction, accompanied also by corresponding movements of the heater element 42 and of the thermostatic switch structure 129—125 (Figures 5 and 6), and accordingly the conductors leading to these parts, namely conductors 45—45 and conductors 126—127, respectively, are preferably in the form of flexible insulated cord, as shown in Figure 5, preferably terminating in plugs 174 and 175, respectively, both preferably two-pronged, as shown in Figure 7. In the right-hand rear corner of the base plate 11 (see Figures 5 and 2), I preferably position a control box 176, made accessible through a wall in the casing 10 by any suitable door, or the like (not shown), and in the front wall of the box 176 I mount two receptacles, as diagrammatically indicated in Figure 7, for the reception of the prongs of the plugs 174 and 175, respectively; the socket contacts of these receptacles are connected in series, as shown in Figure 7, so that the thermostatically controlled switch 125 will close or interrupt the circuit of the heater element 128 and conductors 177 and 178, across which is connected a pilot light 179 exposed externally of the control box 176 (see Figure 2), connects the resultant circuit to conductors 180 and 181 of a flexible insulated two-conductor structure that passes through a wall in the box 176 and is of a suitable length, terminating in a plug 182 (Figures 5 and 7) to permit its connection to any suitable or appropriate power or lighting circuit. However, on the power side of the pilot light 179 (Figure 7) I connect a switch 183 whose operating member is exposed through the top wall of the box 176 (Figures 2 and 5) for convenient manual operation. When the switch 183 is closed, the pilot light 179 lights up and indicates that the heater circuit is turned on and that it is under the control of the thermostatic switch.

The motor 76 is connected by conductors 184, 185 (Figures 5 and 7) to the conductors 180 and 181, respectively, but through a switch 186 whose operating member is also exposed through the upper face of the box 176 for controlling the operation of the motor 76. Preferably, the device 186 is in the form of a combined switch and rheostat, as indicated in Figure 7, so that also the speed of the motor 76 and hence the time interval that it takes a single basket to pass through the cooking bath may be controlled at will. These various controls are preferably independent of each other, as above described, so that, for example, the motor need not be started until the heater element has brought the temperature of the bath up to the desired value.

When, therefore, it is desired to remove the tank 40, as for purposes of cleaning it, the plugs 174 and 175 (Figure 5) may be pulled out while the length of the flexible conductors 45—45 and 126—127 is normally sufficient to give the tank the leeway of movement corresponding to that of the table 151 (Figure 4) when the tank is lowered and withdrawn only sufficiently to pour into it or replenish the liquid.

It will thus be seen that there has been provided in this invention an apparatus in which the various objects heretofore noted together with many thoroughly practical advantages are successfully achieved. It will be seen that the apparatus is thoroughly practical, is of rugged construction and reliable action, and well adapted to meet the varying conditions of practical use. For display purposes particularly, it lends itself to embodiment in quite diminutive form, for example, a length as viewed in Figures 1, 2 and 3 on the order of only about two feet or so, while its capacity is continuous and adequate and widely controllable to meet the variabilities of demand for its product and continuity of display.

As many possible embodiments may be made of the above invention and as many changes might be made in the embodiment above set forth, it is to be understood that all matter hereinbefore set forth, or shown in the accompanying drawings, is to be interpreted as illustrative and not in a limiting sense.

I claim:

1. An apparatus for cooking or treating products like edibles comprising a plurality of baskets having endless flexible carrier means therefor with means guiding said carrier means to move said baskets in a closed path lying in a vertical plane so disposed that said path has at least two portions, a tank positioned so that its bottom underlies one of said portions of said path and being of sufficient width and length to permit entry thereinto of baskets as they enter said path portion for submergence in a suitable medium in said tank and to be moved along and within the latter throughout said path portion and to be lifted out of said tank toward the end of said path portion, a discharge chute having a receiving portion operatively related to said other path portion, means pivotally suspending the baskets from said endless carrier means for oscillation about an axis at right angles to said vertical plane, and means operative when a basket reaches said discharge chute for effecting discharge of the contents of the basket into said chute, said discharge-effecting means comprising a portion of each basket movable to provide upon movement in one direction a discharge opening for discharging the contents carried by the basket, said movable portion having a control member, cam means positioned near the end of said upper path portion to actuate said control member as the basket with the latter moves into the discharge position, and means positioned to coact successively with the baskets as the latter are successively brought to discharge position to hold the basket against tilting about its axis of pivotal support and thereby to insure that said cam means and said control member coact to effect said discharge opening.

2. An apparatus for cooking or treating products like edibles comprising a plurality of baskets having endless flexible carrier means therefor with means guiding said carrier means to move said baskets in a closed path lying in a vertical plane so disposed that said path has at least two portions, a tank positioned so that its bottom underlies one of said portions of said path and being of sufficient width and length to permit entry thereinto of baskets as they enter said path portion for submergence in a suitable medium in said tank and to be moved along and within the latter throughout said path portion and to be lifted out of said tank toward the end of said path portion, a discharge chute having a receiving portion operatively related to said other path portion, means pivotally suspending the baskets from said endless carrier means for oscillation about an axis at right angles to said vertical plane, and means operative when a basket reaches said discharge chute for effecting discharge of the contents of the basket into said chute, said discharge-effecting means comprising two opposed basket wall portions pivotally mounted for movement away from each other to provide a discharge opening for discharging the basket contents and each movable wall portion having a control member, the axis of pivoting being parallel to the direction of movement of the basket along said upper path portion, stationary means positioned in the path of movement of said two control members for actuating the latter in opposite directions to move said wall portions about their respective pivoting axes as the basket is over said discharge chute, and means positioned to engage the basket as it moves over said discharge chute and to prevent the reaction between said control members and said stationary means from tilting the basket about the axis of its pivotal connection to said carrier means.

3. An apparatus for cooking or treating products like edibles comprising, in combination, a plurality of baskets having endless flexible carrier means therefor with means guiding said carrier means to move said baskets in a closed path lying in a vertical plane so disposed that said path has at least two portions one above the other, a tank positioned so that its bottom underlies the lower portion of said path and being of sufficient width and length to permit entry thereinto of baskets as they enter said lower path portion for submergence in a suitable medium in said tank and to be moved along and within the latter throughout said lower path portion and to be lifted out of the tank toward the end of said path portion, a discharge chute having a receiving portion positioned intermediate of said two path portions and near the end of said upper portion whereby said baskets have to travel throughout a substantial part of said upper path portion before reaching said discharge chute and thereby to cause said tank to catch any dripping from said baskets, means operative when a basket reaches said discharge chute for effecting discharge of the contents of the basket into said chute, other portions of said chute guiding the discharged material out of the space between said two path portions, an enclosure or casing for enclosing the entire apparatus, a slide slidably supported at a lower portion of said casing and having thereon means movably supporting said tank for movement in an up and down direction whereby said tank may be moved into or out of operative relation to said lower path portion without interfering with the baskets in said lower path portion, a vertical wall of said casing having an opening through which said slide is movable.

4. In apparatus of the character described, in combination, a plurality of baskets having endless flexible carrier means therefor with means guiding said carrier means to move said baskets in a closed path lying in a vertical plane so disposed that said path has at least two portions one above the other, a tank positioned so that its bottom underlies the lower portion of said path and being of sufficient width and length to permit entry thereinto of baskets as they enter said lower path portion for submergence in a suitable medium in said tank and to be moved along and within the latter throughout said lower path portion and to be lifted out of the tank toward the end of said path portion, said tank having means movably and removably mounting it and capable upon operation to move said tank into or out of operative relation to the baskets in said lower path portion, electric heater means associated with said tank and thermostatic switch means responsive to the temperature of the medium in said tank for maintaining said medium at a desired temperature, and flexible electrical circuit connections leading to said heater and switch means and permitting movement of the latter with said tank.

5. An apparatus for cooking or treating products like edibles comprising in combination, a plurality of receptacles each having a movably mounted wall portion capable upon movement of effecting discharge of the contents thereof, each wall portion having a control member, means comprising two spaced synchronously driven endless flexible members with guide means therefor to cause said two members to move in a closed path, the plane of which is vertical and means including trunnions for pivotally supporting said receptacles from said two endless members and in spaced relation and with the axis of pivoting extending at right angles to said plane, means positioned in the path of travel of said receptacles as provided by said flexible members for treatment of the product carried by said receptacles, means positioned at a certain point in said path and positioned to be engaged by a control member as a receptacle moves therealong for actuating said control member to cause movement of a receptacle wall portion to effect discharge of the receptacle contents, and means coacting with the receptacle undergoing discharge actuation for preventing the reaction between said control member and said means from effecting undesired tilting of the receptacle about the axis of its trunnions.

6. In apparatus of the character described, in combination, a plurality of baskets having endless flexible carrier means therefor with means guiding said carrier means to move said baskets in a closed path lying in a vertical plane so disposed that said path has at least two portions one above the other, a tank positioned so that its bottom underlies the lower portion of said path and being of sufficient width and length to permit entry thereinto of baskets as they enter said lower path portion for submergence in a suitable medium in said tank and to be moved along and within the latter throughout said lower path portion and to be lifted out of the tank toward the end of said path portion, manually controllable means movably supporting said tank for movement in a general up and down direction to move said tank into or out of operative relation to said lower path portion without interfering with the baskets that happen to be in the latter, heater means associated with said tank for heating the medium in the latter, said tank having a chamber therein whose walls are exposed to the medium, said chamber having an end open exteriorly of said tank, and means for controlling said heater means and including a thermally responsive member removably received in said chamber through said open end thereof and being by the walls of said chamber held in thermal relationship to the medium in said tank.

7. In apparatus of the character described, in combination, a plurality of baskets having endless flexible carrier means therefor with means guiding said carrier means to move said baskets in a closed path lying in a vertical plane so disposed that said path has at least two portions one above the other, a tank positioned so that its bottom underlies the lower portion of said path and being of sufficient width and length to permit enetry thereinto of baskets as they enter said lower path portion for submergence in a suitable medium in said tank and to be moved along and within the latter throughout said lower path portion and to be lifted out of the tank toward the end of said path portion, a housing-like casing enclosing the aforesaid apparatus, said casing having an opening therein with a movable closure therefor, and means mounting said tank for movement with said closure and into or out of said casing according as said closure is moved into or out of closing position relative to said opening.

8. In apparatus of the character described, in combination, a plurality of baskets having endless flexible carrier means therefor with means guiding said carrier means to move said baskets in a closed path lying in a vertical plane so disposed that said path has at least two portions one above the other, a tank positioned so that its bottom underlies the lower portion of said path and being of sufficient width and length to permit entry thereinto of baskets as they enter said lower path portion for submergence in a suitable medium in said tank and to be moved along and within the latter throughout said lower path portion and to be lifted out of the tank toward the end of said path portion, a housing-like casing for enclosing the aforesaid apparatus, said casing having a vertical side wall with an opening therein extending lengthwise of said tank, a slide carried by said casing and movable into or out of said casing through said opening, and means supporting said tank from said slide and including manually controllable means for moving said tank in a general up and down direction to move said tank into or out of operative relation to said lower path portion.

9. In apparatus of the character described, in combination, a plurality of receptacles for receiving a product to be treated, a tank for receiving a suitable medium for treating said product, means mounting said receptacles for movement successively into and out of said tank for submergence in the medium in the latter, means mounting said tank in position to receive successive receptacles move thereinto by said first-mentioned mounting means, said tank-mounting means comprising a horizontally movable slide and means movably supporting said mounting means from said slide for movement in a general up and down direction.

10. In apparatus of the character described, in combination, a plurality of receptacles for receiving a product to be treated, a tank for receiving a suitable medium for treating said product, means mounting said receptacles for movement successively into and out of said tank for submergence in the medium in the latter, means mounting said tank in position to receive successive receptacles moved thereinto by said first-mentioned mounting means, a housing-like casing for enclosing said apparatus, said casing having an opening of sufficient size to permit said tank to pass therethrough, a closure for said opening, and means supporting said tank-mounting means from said closure whereby said tank may be removed from or inserted into said casing according as said closure is moved out of or into closing position.

11. In apparatus of the character described, in combination, a plurality of receptacles for receiving a product to be treated, a tank for receiving a suitable medium for treating said product, means mounting said receptacles for movement successively into and out of said tank for submergence in the medium in the latter, means mounting said tank in position to receive receptacles moved successively thereinto by said first-mentioned mounting means, a housing-like casing for enclosing said apparatus, said casing having a side opening of sufficient size to permit said tank to pass therethrough, a closure for said opening, and means supporting said tank-mounting means from said closure whereby said tank may be removed from or inserted into said casing according as said closure is moved out of or into closing position, said supporting means for said tank-mounting means including manually controllable means for effecting movement of said tank in a general up and down direction relative to said closure to lower said tank out of operative relation to said mounting means for said receptacles and to aline it with said opening for removal therethrough with said closure, or vice versa.

12. An apparatus for cooking or heating products like edibles comprising, in combination, a plurality of containers for receiving the product to be treated, movable carrier means therefor for moving said containers throughout a certain path, there being at a certain point in said path means for effecting treatment of the products carried by said containers, said containers each having a pivotal connection to said carrier means for pivotally supporting said containers for pivoting about an axis at right angles to the path of movement thereof, each container having two opposed movable wall portions each pivoted to the container to swing about an axis parallel to said path of movement, spring means acting upon each wall portion to hold it in container-closing position, the movable wall portions of each container having each a control member projecting therefrom and the two control members of each container being spaced in a direction transversely of said path, means positioned at another point in said path and in the paths of movement of the spaced control members as a basket moves therealong for actuating said control members in opposition to said spring means to cause movement of the respective wall portions into container-opening positions to effect discharge of the container contents, and means positioned to engage a container during the aforesaid actuation of said control members to hold the container against tilting about the axis of its pivotal connection to said carrier means.

13. In apparatus of the character described, in combination, a plurality of receptacles for carrying a product to be treated, treatment means for giving the product the desired treatment and including a device constructed to envelop a receptacle upon at least two sides thereof, means mounting said receptacles for movement successively into and out of operative relation to said treatment means and into enveloping relation with said device, a housing-like casing for enclosing said apparatus, said casing having an opening of sufficient size to permit said treatment means with said device to be passed therethrough, a movable closure for said opening, and means mechanically connecting said treatment means and said movable closure whereby said treatment means may be removed from or inserted into said casing according as said closure is moved out of or into closing position.

14. An apparatus for cooking or treating products like edibles comprising, in combination, a plurality of baskets having endless flexible carrier means therefor with means guiding said carrier means to move said baskets in a closed path lying in a vertical plane so disposed that said path has at least two portions one above the other, a tank positioned so that its bottom underlies the lower portion of said path and being of sufficient width and length to permit entry thereinto of baskets as they enter said lower path portion for submergence in a suitable medium in said tank and to be moved along and within the latter throughout said lower path portion and to be lifted out of the tank toward the end of said path portion, and means movably supporting said tank for movement in a general up and down direction and for movement in a direction transversely to the said up and down direction whereby said tank may be moved downwardly and out of operative relation to the baskets in said lower path portion and then moved transversely without interfering with the said baskets, or vice versa, said tank mounting means comprising a main carrier support having means mounting it for movement in said second-mentioned direction, an auxiliary carrier support for supporting said tank, and manually controllable reversible elevating means supporting said auxiliary carrier support from said first-mentioned carrier support whereby the former with the tank supported thereby is movable in said first-mentioned direction.

15. An apparatus for cooking or treating products like edibles comprising, in combination, a plurality of baskets having endless flexible carrier means therefor with means supporting and providing guiding means for said carrier means to move said baskets in a closed path lying in a vertical plane so disposed that said path has at least two portions one above the other, a tank positioned so that its bottom underlies the lower portion of said path and being of sufficient width and length to permit entry thereinto of baskets as they enter said lower path portion for submergence in a suitable medium in said tank and to be moved along and within the latter throughout said lower path portion and to be lifted out of the tank toward the end of said path portion, means for supporting said tank to position it in the aforesaid operative relation to said lower path portion, manually controllable reversible elevating mechanism interposed between said two supporting means to move one of said supporting means relative to the other to bring said tank and the baskets in said lower path portion out of or into operative relation to each other.

GEORGE L. GUSTAFSON.